United States Patent
Tuthill

(10) Patent No.: US 6,896,463 B2
(45) Date of Patent: May 24, 2005

(54) SPINDLE NUT RETAINER

(75) Inventor: James Craig Tuthill, Elkhart, IN (US)

(73) Assignee: Dexter Axle Company, Elkhart, IN (US)

( * ) Notice: Subject to any disclaimer, the term of this patent is extended or adjusted under 35 U.S.C. 154(b) by 117 days.

(21) Appl. No.: 09/971,131

(22) Filed: Oct. 4, 2001

(65) Prior Publication Data

US 2003/0066398 A1 Apr. 10, 2003

(51) Int. Cl.[7] ................................. B23B 3/00
(52) U.S. Cl. .................. 411/116; 411/117; 411/120; 411/121; 411/431
(58) Field of Search .................. 411/116, 117, 411/118, 120, 121, 372.5, 372.6, 431

(56) References Cited

U.S. PATENT DOCUMENTS

| | | | | |
|---|---|---|---|---|
| 1,316,344 A | * | 9/1919 | Wooden | 411/198 |
| 1,349,404 A | * | 8/1920 | Blake | 411/126 |
| 2,013,526 A | * | 9/1935 | Schmitt | 411/198 |
| 3,851,690 A | * | 12/1974 | Wing et al. | 411/190 |
| 4,557,654 A | | 12/1985 | Masuda et al. | |
| 4,812,094 A | * | 3/1989 | Grube | 411/134 |
| 5,082,409 A | * | 1/1992 | Bias | 411/431 |
| 5,215,336 A | * | 6/1993 | Worthing | 285/81 |
| 5,350,266 A | | 9/1994 | Espey et al. | |
| 5,362,111 A | * | 11/1994 | Harbin | 285/92 |
| 5,364,213 A | * | 11/1994 | Teramura | 411/431 |
| 5,395,192 A | | 3/1995 | Bennett | |
| 5,586,790 A | * | 12/1996 | Bynum | 285/89 |
| 5,606,753 A | * | 3/1997 | Hashimoto | 411/7 |
| 5,618,143 A | * | 4/1997 | Cronin et al. | 411/220 |
| 5,674,034 A | | 10/1997 | Bennett | |
| 5,795,037 A | | 8/1998 | Hagelthorn | |
| 5,906,463 A | | 5/1999 | Damm et al. | |
| 5,967,721 A | * | 10/1999 | Giachinta et al. | 411/7 |
| 5,967,723 A | | 10/1999 | Duran | |
| 5,988,966 A | | 11/1999 | Chen et al. | |
| 6,010,290 A | * | 1/2000 | Slesinski et al. | 411/226 |
| 6,224,167 B1 | * | 5/2001 | Riley | 301/126 |
| 2002/0119027 A1 | * | 8/2002 | Nago | 411/119 |

* cited by examiner

Primary Examiner—Derris H. Banks
Assistant Examiner—Dana Ross
(74) Attorney, Agent, or Firm—Calfee, Halter & Griswold, LLP

(57) ABSTRACT

A spindle nut retainer is provided for preventing a nut threaded upon a spindle from unthreading and detaching from the spindle. The spindle nut retainer includes an integral base section and peripheral section maintaining a cup-shaped configuration. The base section includes an aperture through which the spindle may pass and the peripheral section includes a plurality of fingers which form windows therebetween used to form a locking connection between the spindle nut retainer and the nut.

6 Claims, 2 Drawing Sheets

SPINDLE NUT RETAINER

FIELD OF THE INVENTION

This invention relates to fastener accessories, more particularly to retainers used to prevent the undesired disengagement of nuts from spindles.

BACKGROUND OF THE INVENTION

Retaining nuts are used to secure devices, for example a hub, upon a spindle. Typically both the spindle and nut are threaded. Devices are secured upon the spindle before the nut is screwed onto the spindle, the nut abutting the exterior side of the device. Vibration, associated with the rotation of the spindle, may cause the nut to unscrew and disengage from the spindle. The device is no longer secured and may detach itself from the spindle.

Numerous devices have been used to secure the nut to the spindle. Simple versions of these devices include lock washers, jam nuts, self-locking nuts and slotted nuts used in conjunction with a cotter pin. More advanced versions of securing devices include the controlled axle nut system of U.S. Pat. No. 5,795,037 to Hagelthorn and the nut and bolt locking system of U.S. Pat. No. 5,967,723 to Duran. Hagelthorn provides a retainer member which must be threaded onto the spindle. The threading process can be difficult, especially in cases where the parts are being assembled by machine. Potential assembly difficulties are cross-threading and the need to protect the internal threads of the retainer from damage. Duran provides a nut and washer locking combination where the washer deforms to form an interference fit with flats on the face of the nut as the nut is tightened upon a bolt. Locking contact between the nut and washer occurs only at one end of the nut.

A system which can be easily assembled and which provides a strong locking connection between the spindle nut and the nut retainer is desired.

SUMMARY OF THE INVENTION

The present invention overcomes these and other disadvantages of the prior art by providing a spindle nut retainer which is easily attached to a spindle/nut system and which creates a strong connection between the nut and spindle.

The invention provides in one aspect a spindle nut retainer which prevents a nut from unthreading and becoming detached from a spindle. The spindle nut retainer includes both a base section and peripheral section which together form a cup shape. The base section includes a hole through which the spindle passes. The peripheral section provides a plurality of fingers which form windows within the peripheral section. The fingers also include nut engaging surfaces which engage the corners of the nut to provide a locking connection.

The invention provides in another aspect a spindle nut retainer which includes both a base section and peripheral section which together form a cup shape. The base section includes a hole through which the spindle passes, and the peripheral section includes a plurality of fingers which create one or more longitudinal windows therebetween, the fingers including a flared end bent towards the center of the spindle nut retainer.

The spindle nut retainer of the present invention may be easily attached over the nut without having to be threaded upon the spindle. Further, the spindle nut retainer creates a strong locking connection along the corners of the spindle nut. These and other aspects of the invention are herein described in particularized detail with reference to the accompanying Figures.

DETAILED DESCRIPTION OF THE INVENTION

Figure 1:
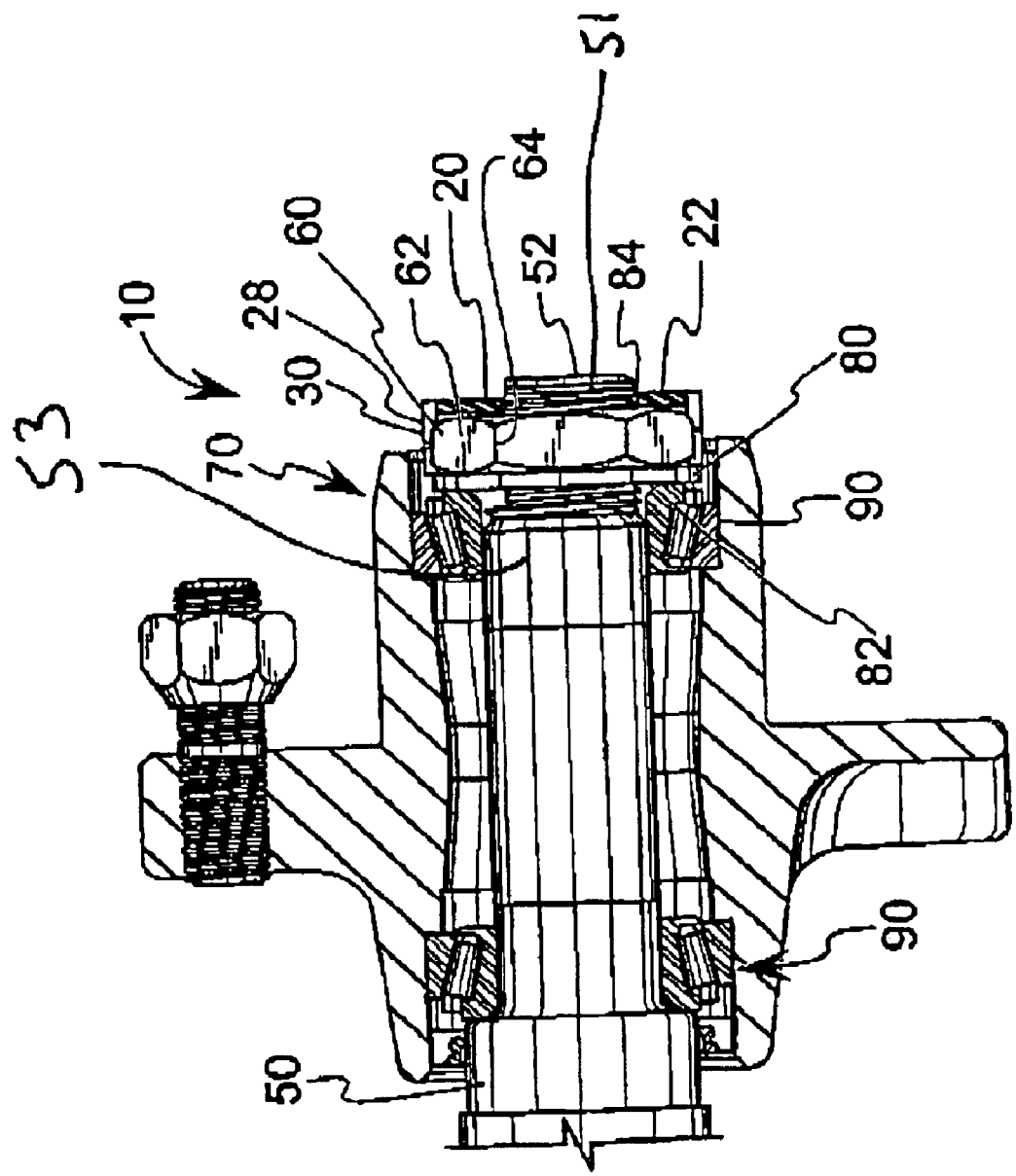
FIG. 1 is a cutaway view of a spindle nut locking system.

Referring to the drawings, FIG. 1 illustrates a preferred spindle assembly 10 according to the invention. The assembly 10 prevents a nut 60 from becoming disengaged from a spindle 50. Disengagement typically occurs as a result of vibration of the spindle 50. The spindle assembly 10 as described in more detail below, comprises a spindle nut retainer 20, a nut 60, and a spindle 50. In the illustrated embodiment, the spindle assembly 10 also comprises a hub 70, one or more bearings 90 and one or more washers 80.

Figure 4:
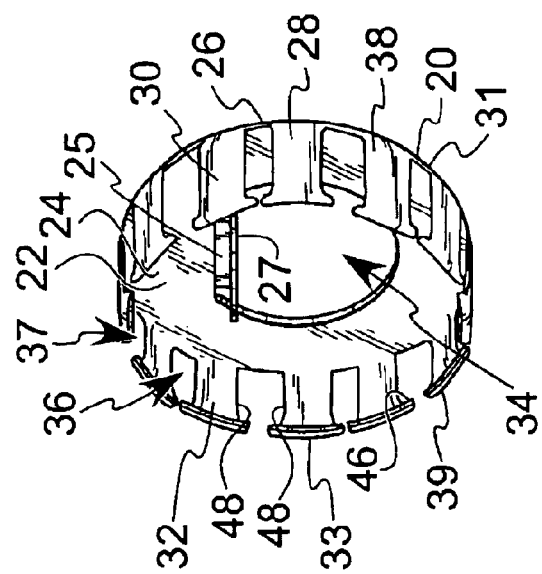
FIG. 4 is a perspective view of an alternate embodiment of the spindle nut retainer.
Figure 3:
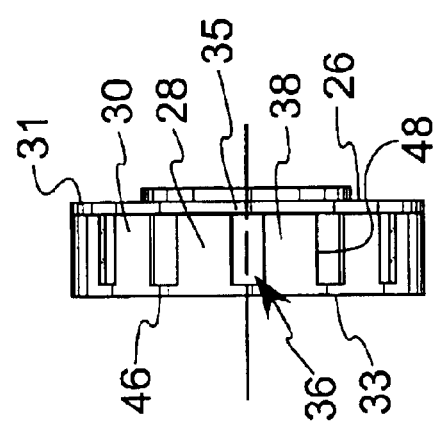
FIG. 3 is a side view of the spindle nut retainer.
Figure 2:
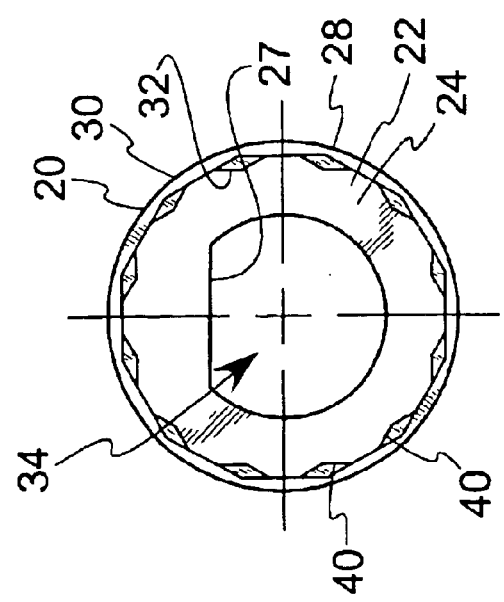
FIG. 2 is a front view of a spindle nut retainer.

Embodiments of the spindle nut retainer 20 are shown in FIGS. 2, 3 and 4 and comprise an integral base section 22 and peripheral section 28 in a cup-shaped configuration. In separate embodiments the spindle nut retainer 20 is made from materials such as steel as shown in FIG. 4, or a polymer as shown in FIGS. 2 and 3. The base section 22 may be flat, having an interior face 24 and an exterior face 26. The base section 22 includes a centrally located aperture 34. The area of the base section 22 around the aperture 34 may be of increased thickness for structural reinforcement. In an embodiment wherein the spindle nut retainer is made of steel, the base section 22 may include a bent tab 25. The bent tab 25 may be integrally formed with the base section 22 and bent to extend from the base section 22 perpendicularly. The aperture 34 may be D-shaped. Throughout the specification, the term "D-shaped" refers to a truncated circular shape. A flat portion of the base section forming the flat section of the "D" is an interference surface 27. The interference surface 27 is transverse to the interior face 24 and exterior face 26 of the base section 22. As a result, there is rotational interference when the retainer 20 is positioned upon an area of the spindle 50 having a D-shaped cross section. In an embodiment wherein the spindle nut retainer is made of steel, the surface of bent tab 25 may be the interference surface 27. The base section 22 may include a manufacturer's brand name.

The peripheral section 28 comprises the walls of the cup-shaped configuration of the spindle nut retainer 20. The peripheral section 28 includes an exterior surface 30 and an interior surface 32. The exterior surface 28 may be circular in shape. A first end 31 of the peripheral section is integral with the base section 22. The peripheral section 28 of the spindle nut retainer 20 may include a series of longitudinal windows 36 aligned in an alternating manner with and defined by solid fingers 38 of the peripheral section 28. The number of windows 36 on a spindle nut retainer 20 may be related to the number of corners on the nut 60, for example two times the number of corners. This allows the spindle nut retainer 20 to be easily fit over the nut 60, without having to rotate the nut 60 into a position of exact alignment. In any position upon the peripheral section 28, an oversized window 37 may be created by removing a finger 38. The windows 36 and fingers 38 allow for increased flexibility of the spindle nut retainer 20 and ease in the manufacturing process. The longitudinal windows 36 also allow the passage of one or more corners 64 of the nut through the spindle nut retainer 20.

The longitudinal windows 36 may extend all the way to the first end 31 of the peripheral section, thus, creating notches 35 within the exterior surface 30 of the base section 22. A second end 33 of the peripheral section, opposite the base section 22, may be a continuous ring. The longitudinal windows 36, when the ring is continuous do not extend completely to the second end 33 of the peripheral section 28. In an embodiment wherein the spindle nut retainer is made of steel, the second end 33 of the peripheral section is not a ring but instead is comprised of the flared ends 39 of each individual finger 38.

In an embodiment wherein the spindle nut retainer 20 is made of polymer, the second end 33 of the peripheral section 28 may have an internal diameter which is smaller than the internal diameter of the remainder of the peripheral section 28. The second end 33 of the peripheral section 28 will then snap over the nut 60 and be locked in place as shown in FIG. 1. In an embodiment wherein the spindle nut retainer 20 is made of steel, the flared ends 39 of each finger 38 may be bent internally to create a locking function. Additionally or alternatively in either embodiment, the corners 64 of the nut 60 which pass through the longitudinal windows 36 may be locked in place by the end surfaces 46 of the windows.

In an embodiment wherein the spindle nut retainer is made of polymer, the peripheral section 28 defines a plurality of nut engaging surfaces 40. Each nut engaging surface 40 is angled. Each finger 38 includes two adjacent nut engaging surfaces 40 angled to form a point on the interior surface 32 of the peripheral section 28. The nut engaging surfaces 40 may extend along the entire length of the interior surface 32 of the peripheral section 28. The nut engaging surfaces 40 create rotational interference between the nut 60 and retainer 20 when the retainer 20 is overlapping the nut 60. In embodiments wherein the spindle nut retainer is made of polymer the end surfaces 46 of the longitudinal windows 36 work in conjunction with the nut engaging surfaces 40 to lock the nut 60 in place. The nut engaging surfaces 40 will interfere with the corners 64 of the nut 60 if the nut is rotated in relation to the spindle nut retainer 20 or vise versa. The end surface 46 of the longitudinal window 36 will interfere with the corner of the nut 60 when the spindle nut retainer 20 is moved axially. In an embodiment wherein the spindle nut retainer is made of steel, the nut 60 is locked in place by the window side surfaces 48, as opposed to the nut engaging surfaces, as well as window end surfaces 46.

Referring to FIG. 1, the spindle assembly 10 further comprises the nut 60 which includes exterior flats 62 and corners 64. The nut 60 is commonly formed of steel. The nut 60 functions to hold a hub 70 upon the spindle 50. The nut 60 is threadedly engaged to the spindle 50. As previously described the nut 60 is locked in place by the spindle nut retainer 20. The spindle assembly 10 may further comprise a hub 70. The hub 70 circumscribes the spindle 50 and rotates freely about the spindle 80. One or more bearings 90 are used between the hub 70 and spindle 50 to allow free rotational engagement. The hub 70 is located on the interior side of the nut 60 and is restrained from disengagement from the spindle 50 by the nut 60. The spindle assembly 10 may further comprise one or more washers 80. In an embodiment, a washer 80 is between the hub 70 and the nut 60. The washer 80 is flat and provides a surface which abuts both the hub 70 and the nut 60.

The spindle assembly 10 further comprises a spindle 50. In an embodiment, the spindle 50 is part of an automobile. The spindle 50 has multiple sections around which components are circumscribed. The spindle 50 includes a threaded section 51 and a non-threaded section 53. In an embodiment, the sections of the spindle 50 have varying diameters. The spindle has two ends. In an embodiment, a section adjacent to one end 52 of the spindle 50 has a D-shaped cross section. This section allows a spindle nut retainer 20 having a D-shaped cross section to circumscribe the spindle 50 which resists rotational movement. One section of the spindle 50 is threaded, allowing engagement with a nut 60 which is similarly threaded.

Although the invention has been shown and described with reference to certain preferred and alternate embodiments, the invention is not limited to these specific embodiments. Minor variations and insubstantial differences in the various combinations of materials and methods of application may occur to those of ordinary skill in the art while remaining within the scope of the invention as claimed and equivalents.

What is claimed is:

1. A spindle nut retainer for preventing disengagement of a nut threadedly engaged to a spindle, comprising:

an integral base section and a generally perpendicular peripheral section maintaining a cup-shaped configuration while in place over the nut;

wherein said base section defines a central aperture; and wherein said peripheral section has an interior surface, includes a plurality of fingers which define one or more longitudinal windows therebetween, said fingers including nut engaging surfaces on the interior surface of the peripheral section, and includes an integrally formed ring at an end of and interconnecting said fingers opposite said base section.

2. The spindle nut retainer of claim 1 wherein said nut engaging surfaces each comprise two angled surfaces.

3. The spindle nut retainer of claim 1 wherein said central aperture is D-shaped.

4. The spindle nut retainer of claim 1 wherein said base section is flat.

5. The spindle nut retainer of claim 1 wherein said base section is reinforced around said central aperture.

6. The spindle nut retainer of claim 1 made from polymer.

* * * * *